US 6,664,701 B1

(12) United States Patent
Ortt et al.

(10) Patent No.: US 6,664,701 B1
(45) Date of Patent: Dec. 16, 2003

(54) BRUSH ASSEMBLY

(75) Inventors: Earl M. Ortt, Bel Air, MD (US); David J. Smith, Glen Burnie, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/171,180

(22) Filed: Jun. 13, 2002

(51) Int. Cl.⁷ .......................... H02K 13/10; H02K 13/00
(52) U.S. Cl. ................... 310/239; 310/246; 310/248
(58) Field of Search ................. 310/239, 246, 310/248, 249

(56) References Cited

U.S. PATENT DOCUMENTS

| | | | |
|---|---|---|---|
| 2,016,173 A | 10/1935 | McNeil | |
| 2,179,279 A | 11/1939 | Brecht | |
| 2,814,096 A | 11/1957 | Herbrecht | |
| 3,143,897 A | 8/1964 | Kohn | |
| 3,158,773 A | * 11/1964 | Diehl | ............ 310/246 |
| 3,177,388 A | 4/1965 | Cook | |
| 3,290,524 A | 12/1966 | Maffey, Jr. | |
| 3,322,331 A | 5/1967 | Kenney et al. | |
| 3,663,914 A | 5/1972 | Lane | |
| 3,784,856 A | * 1/1974 | Preston | ............ 310/239 |
| 4,015,154 A | 3/1977 | Tanaka et al. | |
| 4,039,871 A | 8/1977 | Yamashita et al. | |
| 4,071,788 A | 1/1978 | Martin et al. | |
| 4,082,972 A | 4/1978 | Gerber et al. | |
| 4,134,036 A | 1/1979 | Curtiss | |
| 4,354,128 A | * 10/1982 | Chew et al. | ............ 310/242 |
| 4,559,465 A | 12/1985 | Gagneux | |
| 4,593,220 A | 6/1986 | Cousins et al. | |
| 4,698,534 A | 10/1987 | Smith et al. | |
| 4,720,646 A | 1/1988 | Torimoto | |
| 4,748,739 A | 6/1988 | Muradliyan | |
| 4,866,322 A | 9/1989 | Baumeister et al. | |
| 4,896,067 A | 1/1990 | Walther | |
| 4,953,284 A | 9/1990 | Hammer et al. | |
| 4,955,128 A | 9/1990 | Sogabe et al. | |

(List continued on next page.)

FOREIGN PATENT DOCUMENTS

| | | |
|---|---|---|
| DE | 219374 | 11/1908 |
| DE | 2432204 C2 | 2/1975 |
| DE | 2649181 A1 | 5/1976 |
| DE | 8025424 | 9/1980 |
| DE | G9102340.8 | 5/1992 |
| DE | 19650245 A1 | 6/1998 |
| DE | 10065281 A1 | 7/2002 |
| EP | 0074068 B1 | 3/1983 |
| EP | 0302116 A1 | 2/1989 |
| EP | 0397973 B1 | 11/1990 |
| EP | 0408988 B1 | 1/1991 |
| EP | 0410933 B1 | 1/1991 |
| EP | 0784369 B1 | 7/1997 |
| EP | 0851541 B1 | 1/1998 |
| EP | 0935318 A2 | 8/1999 |
| GB | 1278294 | 6/1972 |
| GB | 2367193 A | 3/2002 |
| SU | 964817 A | * 10/1982 ............ 310/239 |

*Primary Examiner*—Nestor Ramirez
*Assistant Examiner*—David W. Scheuermann
(74) *Attorney, Agent, or Firm*—Harness, Dickey & Pierce, P.L.C.

(57) ABSTRACT

A brush assembly has a base with a member to secure the base to a motor end cap assembly. A brush housing is associated with the base. The brush housing includes first and second open ends. A brush, defining an axis, is slidably supported within the housing. The brush extends from one of the first and second open ends. The brush includes a surface with a spring retention plunge. The spring retention plunge defines an arcuate face angled relative to the axis. A biasing member exerts a force directly on the arcuate face to bias the brush into contract with a commutator. An electrical connection is made between the commutator and a power supply.

6 Claims, 4 Drawing Sheets

U.S. PATENT DOCUMENTS

| | | |
|---|---|---|
| 5,268,607 A | 12/1993 | McManus |
| 5,296,769 A | 3/1994 | Havens et al. |
| 5,329,198 A | 7/1994 | Schmidt et al. |
| 5,487,213 A | 1/1996 | Hult et al. |
| 5,631,513 A | 5/1997 | Coles et al. |
| 5,675,204 A | 10/1997 | Kusumoto et al. |
| 5,714,819 A | 2/1998 | Gilliland et al. |
| 5,717,272 A | 2/1998 | Gobled |
| 5,793,141 A | 8/1998 | Simonsen et al. |
| 6,025,661 A | 2/2000 | Chang |
| 6,031,313 A * | 2/2000 | Sugai et al. ............... 310/239 |
| 6,045,112 A | 4/2000 | Kirkwood |
| 6,087,754 A * | 7/2000 | Berger ...................... 310/240 |
| 6,133,665 A | 10/2000 | Prell et al. |
| 6,177,751 B1 | 1/2001 | Suzuki et al. |

* cited by examiner

BRUSH ASSEMBLY

FIELD OF THE INVENTION

The present invention relates to electric motors and more particularly to brushes and brush assemblies implemented therein.

BACKGROUND OF THE INVENTION

Electric motors are used in a variety of applications, including power tools. Such electric motors generally include a motor shaft, a motor armature, a field pole, field windings, a commutator assembly, brush holders and electrical leads. The electrical leads selectively link brushes to a power source. The motor armature is fixed for rotation with the motor shaft and a series of copper conducting wires are wound in various patterns about peripheral slits. Ends of the wires are fused to the commutator. The commutator is fixed for rotation with the motor shaft and provides an electrical connection between the rotating armature and the stationary brushes. The brush holders each slidably support a carbon brush that is in sliding contact with the commutator. Generally, the stationary brushes are held in contact with an outside surface of the commutator by spring tension and complete the electrical circuit between the rotating commutator and a power source.

Various spring biased mounting configurations have been developed to maintain brush contact with the commutator. Effectiveness and wear durability of the brush is decreased when the brush is subjected to arcing. Arcing generally occurs as a result of the brush bouncing away from the commutator as rough spots and irregularities of the commutator pass under the brush. Prior art brushes include recesses formed therein for retaining an end of a biasing spring for effectively biasing the brush in contact with the commutator. These prior art recesses, however, tend to be overly complex and thus more difficult to manufacture. Further, prior art recesses fail to prohibit lateral movement of the biasing spring.

Therefore, it is desirable in the industry to provide an improved brush having a simplified recess. The recess should concurrently provide sufficient biasing of the brush in contact with the commutator to avoid arcing and other detrimental occurrences.

SUMMARY OF THE INVENTION

A brush assembly is provided for implementation in an electric motor. The brush assembly includes a base with a member to secure the base to a motor. A brush housing is associated with the base and has first and second open ends. A brush, defining an axis, is slidably supported within the housing between said first and second open ends. The brush extends from one of the first and second open ends. The brush includes a surface having a spring retention plunge. The spring retention plunge has an arcuate face angled relative to the axis. The brush assembly further includes a biasing member exerting a force directly on the arcuate face to bias the brush within the housing to contact with a commutator. An electrical connector is electrically coupled with the brush to electrically connect between the commutator and a power supply.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
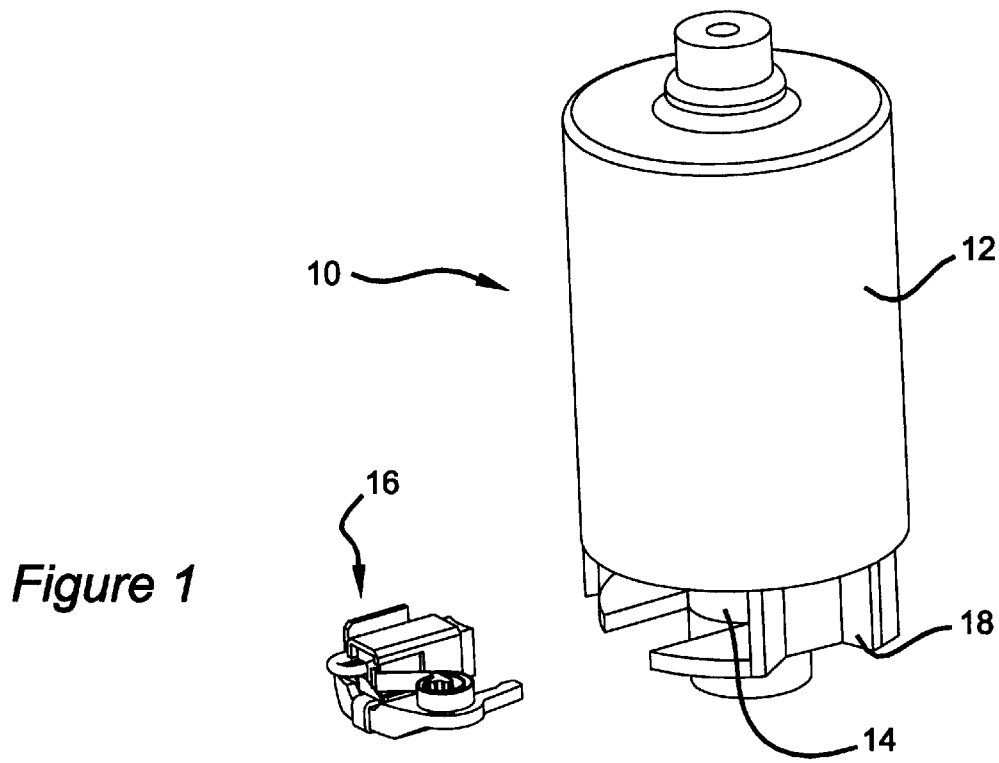
FIG. 1 is a perspective view of a motor including a brush assembly in accordance with the present invention.
Figure 2:
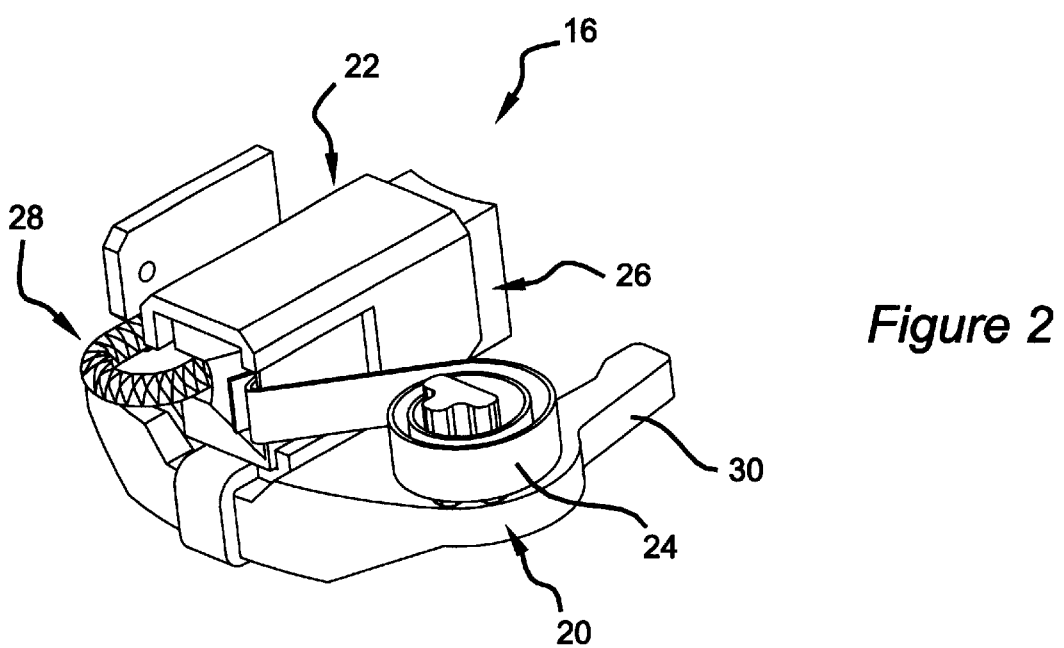
FIG. 2 is a perspective view of the brush assembly.
Figure 3:
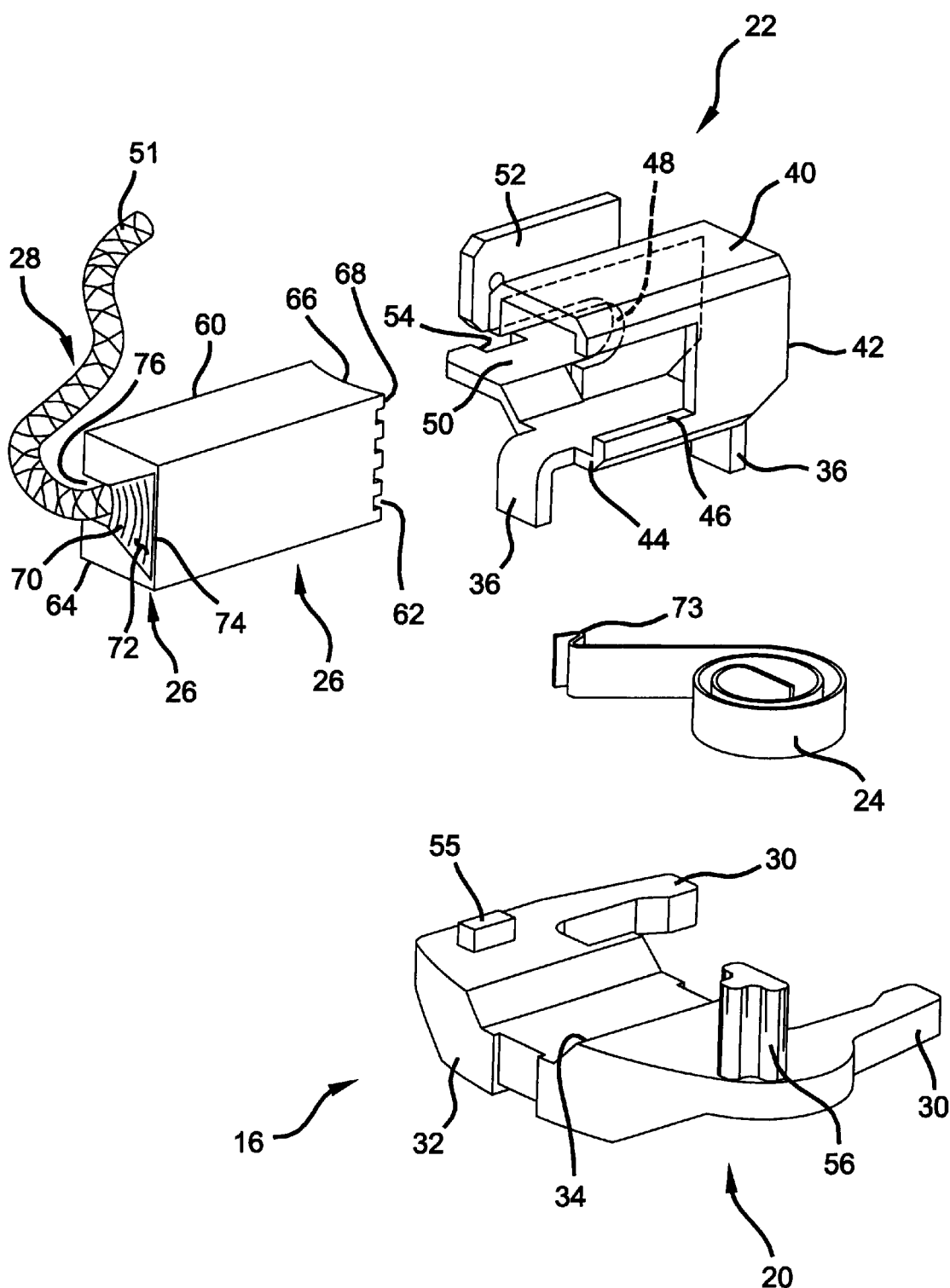
FIG. 3 is an exploded view of the brush assembly.

With particular reference to FIG. 1, a motor 10 is provided and includes a frame 12, windings (not shown), a commutator 14, a brush assembly 16 and a end cap 18. The brush assembly 16 is shown to couple with the end cap 18 and includes a base 20, a housing 22, a spring 24, a brush 26 and an electrical connection 28. The base 20 is preferably formed of a non-metallic or non-electrically conductive material and has a pair of arms 30 to secure the brush assembly 16 to the end cap 18. Further, the base 20 includes a web 32 which connects the two arms 30. The web 32 has a recess 34 which receives the housing 22. The housing 22 is secured in the recess 34 by tabs 36 which are bent under the base 20.

The housing 22 includes an open, tubular member 40 with a rectangular cross-section. The tubular member 40 has first and second open ends 42, 44. The first open end 42 is positioned adjacent to the commutator 14 when the brush assembly 16 is assembled onto the motor 10. First and second slots 46, 48 are positioned on respective sides of the tubular member 40 and extend from the second open end 44. The slots 46, 48, respectively, enable the spring 24 and electrical connector 28 to move with the brush 26. Also, a unitary shunt connection and connector 50 are formed with the housing 22. The connector 50 enables an electrical contact 52 to be coupled with the housing 22. The shunt connection 50 has a cutout 54 which interacts with a tab 55 to enable positioning of the housing 22 on the base 20.

The spring 24 is wound about a post 56 extending from the base 20. The post 56 may be angled off-center with respect to the axis of the base 20. The spring 24 biases the brush 26 through the tubular member 40. The electrical connector 50 is known in the art and includes a pigtail connector 51. An end of the pigtail connector 51 is ultrasonically or restistively welded to the connection member.

Figure 6:
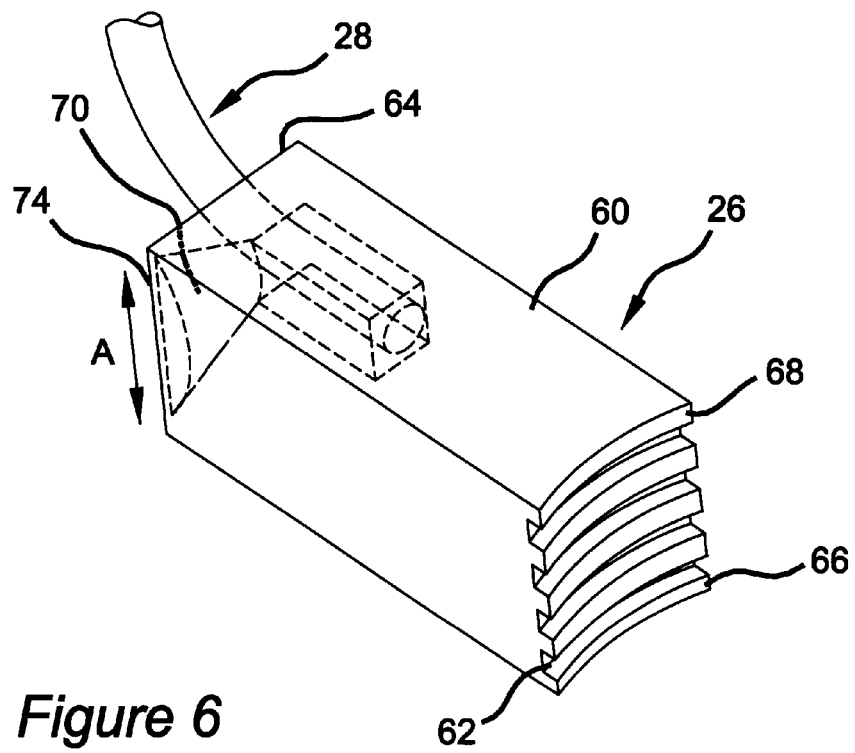
FIG. 6 is a perspective view of a brush of the brush assembly.

The brush 26 includes a rectangularly cross-sectioned body portion 60 with first and second ends 62, 64, respectively. The first end 62 has an arcuate face 66 having a series of ribs 68 (see FIG. 6). The ribs 68 are in sliding contact with the commutator 14 when the brush assembly is assembled onto the motor 10. The second end 64 includes a spring retention plunge 70. The spring retention plunge 70 is a generally conical-shaped depression, with a sloping, arcuate face 72 forming a wall 74. A recess 76 is also provided and includes a surface where the pigtail 50 interconnects with the brush 26.

Figure 4:
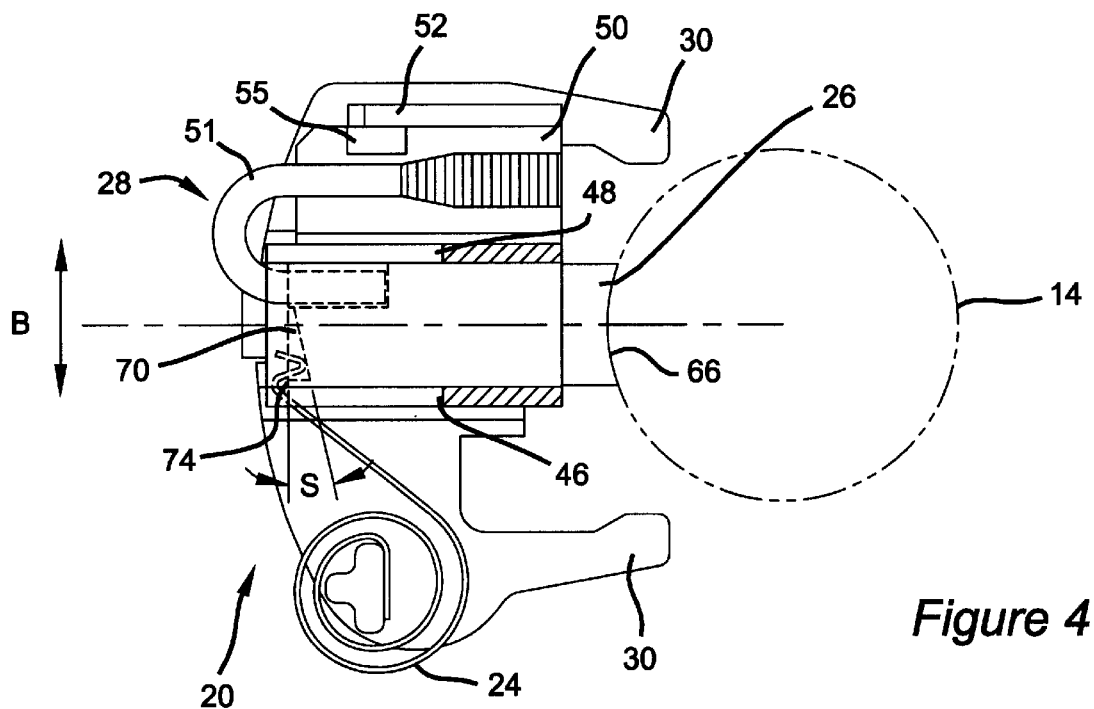
FIG. 4 is a plan view of the brush assembly in non-worn condition relative to a commutator shown in phantom.
Figure 5:
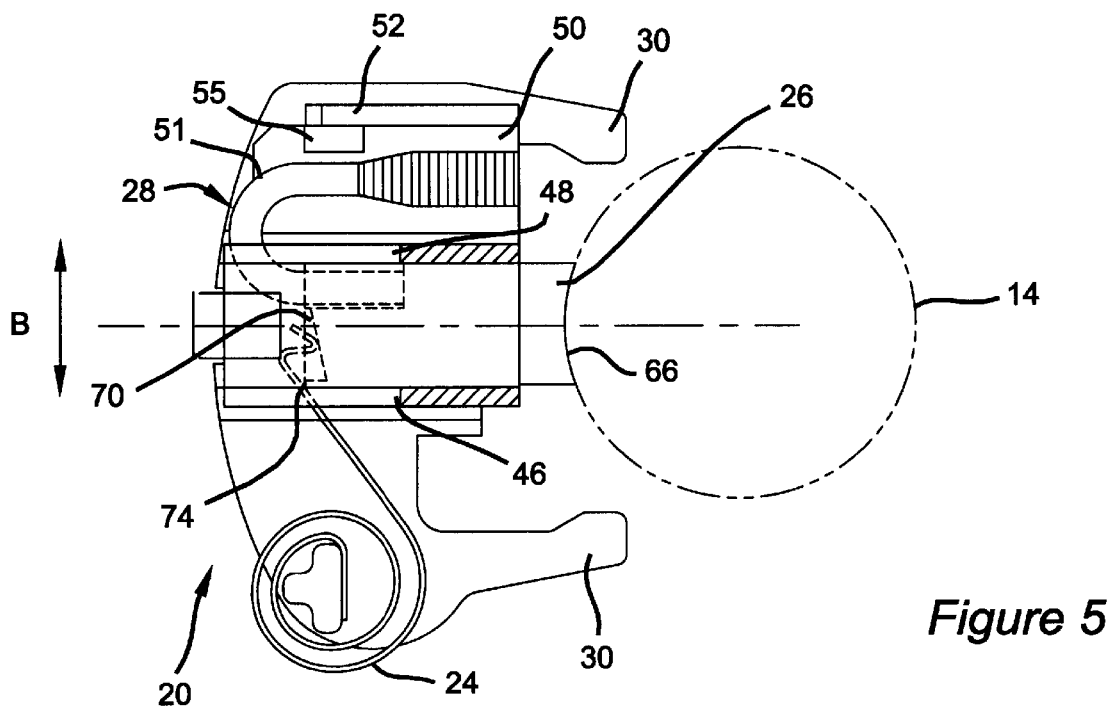
FIG. 5 is a plan view of the brush assembly in a worn condition relative to the commutator.

The slope S (see FIG. 4) of the arcuate face 72 of the spring retention plunge 70 is preferably greater than 0 and less than or equal to 15 degrees. It will be appreciated, however, that this range may deviate as design requirements dictate. The spring retention plunge 70 is formed to retain a contact end 73 of the spring 24. The contact end 73 is prohibited from moving along a lateral axis A (see FIG. 6) of the brush 26. Likewise, the contact end 73 has limited movement along a transverse axis B (see FIG. 4) of the brush 26. More specifically, the wall 74 prohibits excessive travel of the contact end 73 along the transverse axis B, in that direction. The slope of the spring retention plunge 70 enables the contact end 73 of the spring 24 to ride within the spring retention plunge 70 to provide constant contact with the brush 26. Ordinarily, the contact end 73 rides at the bottom of the arc. This constant contact provides the force which, due to the slope, is substantially constant during wear of the brush 26. The constant force eliminates bouncing of the brush 26 and therefore increases the brush wear durability and prohibits damage to the commutator 14.

The spring retention plunge 70 of the brush 26 provides another advantage in that it is more easily manufactured than prior art forms. More particularly, to form the plunge 70, a single step process may be implemented, whereby a grinding wheel or round mill is plunged into the brush 26 at an angle relative to the top face of the brush 26. The grinding wheel diameter, tilt angle and cut depth can be varied to provide an optimum plunge 70. For optimization, the width and slope of the plunge 70 are considerations for the amount of play the spring 24 will have while still biasing the brush 26. In this manner, manufacture of the brush 26 is variable and simplified and savings are achievable in both cycle time and machine cost.

Figure 7:
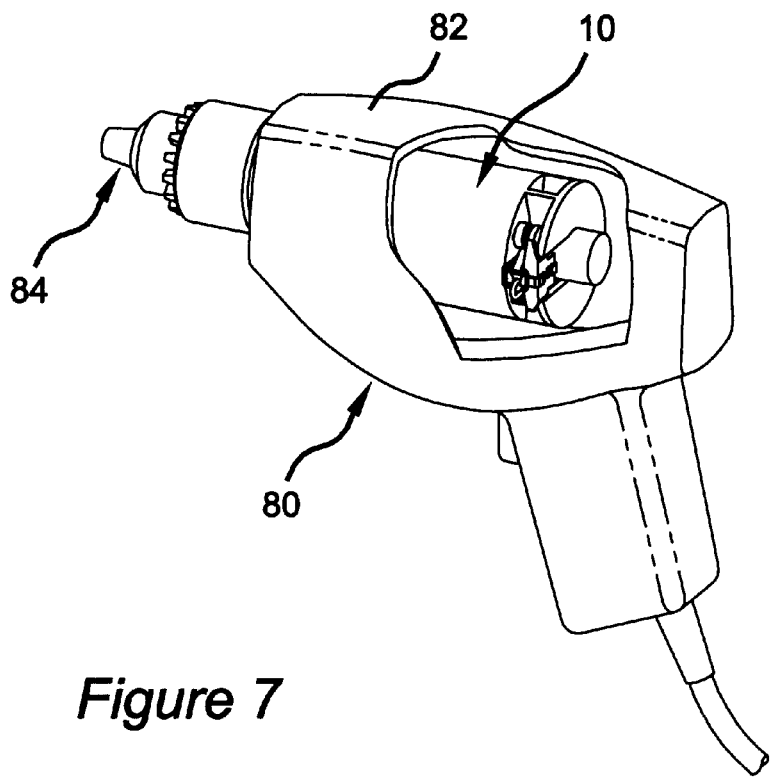
FIG. 7 is a perspective view of a power tool implementing the motor of FIG. 1.

With particular reference to FIG. 7, an exemplary power tool 80 is shown, such as a power drill. The power tool 80 includes a housing 82 having the motor 10 mounted therein, and an output member 84 in driven engagement with the motor 10. A power supply, such as a power cord or battery, is also included to respectively provide remote or local drive power to the motor 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A brush assembly for an electric motor having an end cap assembly and a commutator, comprising:

a base having a member for securing said base to the motor end cap assembly;

a brush housing associated with said base and having first and second open ends;

a brush, defining an axis, slidably supported within said housing between said first and second open ends, said brush extending from one of said first and second open ends, said brush including a surface having a spring retention plunge, said spring retention plunge defining an arcuate face angled relative to said axis on an angle greater than 0° and up to 15°;

a biasing member having a contact end exerting a force directly on said arcuate face for biasing said brush within said housing for contact with the commutator, said contact end defining a line which extends across said arcuate face such that said contact end abuts said arcuate face along said line for prohibiting excessive movement of the contact end along an axis transverse to said brush axis; and an electrical connector electrically coupled with said brush for electrical connection between the commutator and a power supply.

2. The brush assembly of claim 1, wherein said brush further includes a wall formed in said surface for retaining contact of said biasing member with said spring retention plunge.

3. The brush assembly of claim 1, wherein a slope of said spring retension plunge enables transverse retention of said spring.

4. A brush for an electric motor, comprising:

a body having a desired configuration for fitting within a housing, said body defining an axis; and a spring retention plunge formed in a surface of said body, said plunge defining an arcuate face angled relative to a plane transverse to said axis, said surface at a terminal end of said body, wherein a slope of said arcuate face is greater than zero degrees and up to 15°, said arcuate face having a curvature sized to receive a spring such that the spring contacts the arcuate face along a line to prohibit excess movement of the spring on the arcuate surface for enabling spring force exerted thereon to be substantially constant as said body wears.

5. The brush of claim 4, wherein said plunge further forms a wall in said surface for retaining contact of a biasing member with said spring retention plunge.

6. The brush of claim 4, wherein said slope of said spring retention plunge enables transverse retention of a biasing member.

* * * * *